United States Patent Office 3,418,292
Patented Dec. 24, 1968

3,418,292
POLYMERIZATION PROCESS
Irving E. Muskat, Miami, Fla., assignor, by mesne assignments, to Sinclair Research, Inc., a corporation of Delaware
No Drawing. Continuation of application Ser. No. 191,276, Apr. 30, 1962. This application Jan. 3, 1967, Ser. No. 607,076
11 Claims. (Cl. 260—78.5)

ABSTRACT OF THE DISCLOSURE

There is disclosed an improved method of copolymerizing an olefinic compound, e.g., styrene, and a maleic compound, e.g., maleic anhydride, which involves simultaneously bringing the olefinic compound, the maleic compound and a free-radical initiating catalyst, e.g., a peroxide catalyst such as benzoyl peroxide, into contact with a solvent which has been pre-heated to the desired polymerization temperature, e.g., about 75 to 300° C., and in which both the reactant monomers and the copolymer product are soluble.

---

This application is a continuation of application Ser. No. 191,276, filed Apr. 30, 1962, now abandoned.

The present invention is concerned with a novel method of polymerization, especially the copolymerization of an olefinic compound such as styrene, with a maleic compound such as maleic anhydride.

The copolymerization of certain olefinic compounds with certain maleic compounds has long been known and various techniques of solution, bulk, and the like processing have been described. One of the most important copolymerization processes has been the copolymerization of styrene with maleic anhydride to form a copolymer in essentially a 1:1 molar ratio. This copolymerization has been performed in a bulk type reaction; e.g., wherein the reagents along with the catalyst, usually a peroxide catalyst, are mixed together and then heated to polymerization temperature. In those instances wherein an organic liquid media, usually benzene or xylene, is employed, the reagents are again generally mixed into the media and the entire mixture then heated to the appropriate reaction temperature. Two classes of liquid media have been employed; viz., those in which the copolymer product is insoluble—for example, the hydrocarbons such as xylene; and those in which the copolymer product is essentially completely soluble, resulting in a homogeneous solution. In the latter instance, certain ketones such as acetone and methyl ethyl ketone have been employed. The above-described processing is set forth in more detail and typified by U.S. Patents Nos. Reissue 23,514, 2,313,728, 2,430,313, 2,640,819, and 2,675,370.

Despite the wealth of work done in this area, there still exist certain profound and inherent disadvantages to the prior art processes. By way of example, the prior procedures have suffered from the inherent disadvantage that the polymerization reaction is uncontrollable once it has been initiated. Indeed, procedures—especially in relation to the copolymerization of styrene with maleic anhydride—have resulted in serious explosions, thus preventing the most effective utilization of the copolymer materials by the industry. A still further inherent disadvantage of the prior art process has been that only high molecular weight, high viscosity copolymers having only a 1:1 molar ratio of styrene to maleic anhydride have been heretofore obtainable. A still further inherent disadvantage of the prior art procedures is that the copolymers produced generally have a broad molecular weight range and thus the utility of the copolymers is adversely affected.

The copolymers of olefinic compounds such as styrene with maleic compounds such as maleic anhydride are of considerable utility, particularly for employment as resins or derivatives thereof in paints, floor polishes, textile sizing, tanning solutions and the like. Therefore it is highly desirable to the industry to provide a more effective and efficient mode of producing such copolymers which would thereby not only increase the aforementioned uses thereof, but also promote even additional uses by virtue of their greater availability and the even more consistent and specific properties of the products obtained.

Accordingly, an object of the present invention is to provide a more effective and improved method for the copolymerization of an olefinic compound with a maleic compound. A further object is to provide a process wherein the danger inherent in the prior art processes is obviated. A still further object is to provide a process wherein more consistent and specific properties of the copolymer are obtained, especially wherein copolymers of low molecular weight and low viscosity are obtained. A specific object of the invention is to provide an improved process for the copolymerization of styrene with maleic anhydride in varying molar ratios, especially from 1 to 3 moles of the former per mole of the latter, employing a peroxide catalyst. Other objects will be apparent from the discussion hereinafter.

The above and other objects are accomplished by simultaneously bringing an olefinic compound, a maleic compound, and a free-radical initiating catalyst together either with or without a solvent and into contact with a solvent which has been pre-heated to the desired polymerization temperature, and which is a solvent for both the monomers and the copolymer produced. A most effective method for proceeding according to the novel processing comprises first forming a solution of the olefinic compound, the maleic compound, and the free-radical generating catalyst at conditions wherein essentially no copolymerization takes place; then feeding this solution to a solvent, preferably the same solvent as that which is employed for forming the solution, which has been pre-heated and is maintained at the desired polymerization temperature, and which preferably contains less than about 3 percent by weight of unreacted monomers therein, with the feeding of the solution being at a rate which does not substantially exceed the rate of copolymerization of the monomers, nor exceed the maximum of about 3 percent by weight of unreacted monomers resulting in the pre-heated solvent. Of the olefinic compounds, the aryl-substituted α-olefins, especially styrene, are preferred; and of the maleic compounds, maleic anhydride is preferred. Likewise, for the most effective results, the lower boiling simple ketones, especially those wherein at least one carbon atom attached to the carbonyl carbon atom contains at least one hydrogen atom bonded thereto, are employed as the solvent. It has also been found that the best results are obtained when the polymerization reaction is conducted at a temperature between about 75–250° C.; i.e., the solvent to which the reagents are fed, as set forth above, is maintained at these temperatures. Thus, by way of example of a particularly preferred embodiment of the invention, styrene and maleic anhydride in predetermined molar proportions in conjunction with between about 0.001 to 5 percent by weight of benzoyl peroxide catalyst, based on the total weight of the monomers, are dissolved in a sufficient amount of methyl ethyl ketone to result in a solution containing between about 20–50 percent by weight, based upon the total weight of the solution of monomers and catalyst, at a temperature which does not result in polymerization (usually below about 50° C.), and the resulting solution is then fed to methyl ethyl ketone which has been pre-heated and is maintained at a temperature between about 75–250° C., with the feeding of the solution being at a rate so as not to substantially exceed the rate of copolymerization of the monomers. Other embodiments and more specific details of the invention will be evident as the discussion proceeds.

The processing of the present invention as briefly described and summarized above has many particular advantages over the prior art. By way of example, a new process is obtained which eliminates the prior art problem of violent and, in many cases, explosive reaction especially when styrene and maleic anhydride are the reactants. Indeed, in all instances the reaction proceeds smoothly with safe operation, including operation at temperatures higher than heretofore contemplated and with percent catalyst higher than heretofore contemplated, to produce the desired copolymer in essentially quantitative yield with extremely fast reaction rates. In nearly all instances, the copolymerization is effected essentially instantaneously; and with simple, continuous operation techniques, the rate of production and throughput per unit reactor is enhanced many fold, while additionally avoiding mechanical difficulties with regard to pluggage of lines, recovery of product, and control of reaction conditions. The processing permits the production of copolymers, particulraly of styrene and maleic anhydride, of lower molecular weight and viscosity than made heretofore by the prior art procedures. Still further, the present invention provides a more efficient technique for preparing the higher molecular weight and higher viscosity materials previously known to the art. Still additionally, the process is employable for the production of copolymers containing two or more moles olefinic compound, especially styrene, per mole of maleic compound, especially maleic anhydride; whereas by the prior art procedures, such copolymers have not been prepared. By way of further illustration of the advantages of the present process is the feature of polymerization occuring only at the desired temperature avoiding partial pre-polymerization, uncontrolled reaction, and the like. Another advantage which is worthy of particular note is that the copolymer is obtained dissolved in the solvent and can be employed for various uses as such; e.g., in coating, impregnating, and molding compositions and the like. Likewise, upon hydrolysis or neutralization of the copolymer, after removal of the solvent, even significant quantities of solvent that might be retained in the copolymer product do not result in murky or cloudy solutions, as are obtained with previously employed diluents such as xylene, benzene, and toluene. Still other advantages will be apparent from the further discussion hereinafter.

While the invention is particularly adaptable to the copolymerization of styrene with maleic compounds, especially maleic anhydride, it is to be understood that olefinic compounds in general are employable. The olefinic compounds include monoolefinic and polyolefinic compounds, both conjugated and nonconjugated. Compounds in which the double bond is contained between two terminal carbon atoms of a carbon chain; i.e., $\alpha$-olefins, are particularly suitable because of their greater reactivity in the copolymerization reactions. Thus typical but non-limiting examples of mono-olefinic compounds which are employable include true hydrocarbon olefins such as ethylene, propylene, butene-1, cyclohexen, pentene-1, 4-methylpentene-1, 3-methylhexene-1, 3-methylpentene-1, styrene, vinyl toluene; vinyl halides such as vinyl chloride, bromide or iodide; mono-olefinic esters such as allyl acetate, vinyl acetate, vinyl propionate, and the like; mono-olefinic ethers such as vinyl ethyl ether, vinyl butyl ether and the like; esters of mono-olefinic acids such as methyl acrylate, ethyl methacrylate and the like. Included among typical but non-limiting polyolefinic compounds are butadiene, isoprene, chloroprene, 4-vinylcyclohexene-1, pentadiene-1,3, diallyl phthalate, and the like. Of such olefinic compounds, those which exhibit an exothermic polymerization reaction with the maleic compound (especially maleic anhydride) are preferred. Still further examples of the mono-olefinic compounds will now be evident. It is to be understood that the afore-mentioned compounds can be further substituted with functional groups such as the halogens, keto, nitro and the like groups, provided such are essentially inert in the system and do not significantly inhibit the copolymerization reaction. In general, the olefinic compounds are further defined as such which are preferably soluble in the solvent employed at reaction conditions. The true olefinic compounds, i.e., such compounds containing only carbon and hydrogen, especially such mono-olefinic compounds, have been found to be particularly effective. A specially preferred class of mono-olefinic compounds to be employed comprises the vinyl mono-cyclic aryl compounds having only one vinyl group attached to the ring and having not more than 3 alkyl groups also attached to the ring, wherein the alkyl groups contain up to and including about 3 carbon atoms. Styrene and vinyl toluene, especially the former, comprise particularly preferred olefinic compounds because of their greater availability, reactivity, and resulting more beneficial properties inherent in the copolymers produced therewith.

The maleic compounds copolymerized with the above olefinic compounds are, in general, compounds which have one carboxyl group attached to each carbon atom of an olefinic group; i.e., wherein two carbon atoms are joined by a double bond. The remaining valences of each of the doubly bonded carbon atoms are generally satisfied by organic groupings or inorganic groupings which are essentially inert in the principal copolymerization reaction. Thus, the maleic compound will have only one olefinic linkage. Illustrative of such maleic compounds are materials defined by the following structural formula:

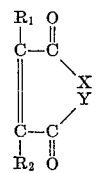

wherein $R_1$ and $R_2$ can be hydrogen, a halogen, the sulfonic acid radical or an alkyl, aryl or aralkyl radical and X and Y can be —OH, O-alkyl, O-aryl or a halogen, or X and Y together can be oxygen or NH. Another way for defining such maleic compounds is to term them as ethylenic-$\alpha,\beta$-dicarboxylic compounds. Thus, typical examples of the maleic compounds include maleic anhydride, methyl maleic anhydride, propyl maleic anhydride, 1,2-diethyl maleic anhydride, phenyl maleic anhydride, cyclohexyl maleic anhydride, benzyl maleic anhydride, chloro maleic anhydride, and the corresponding derivatives of maleic acid; dimethyl maleate, diethyl maleate, dibutyl maleate, diphenyl maleate, and the like esters; maleic acid chloride, bromide or iodide; fumaric acid and its corresponding substituted derivatives; and the like. In general, such maleic compounds are further defined as preferably being soluble in the solvent employed at reaction conditions; and, ordinarily, will preferably contain up to and including about 14 carbon atoms. Maleic anhydride is especially preferred because of its greater availability and the particularly unique copolymers obtained when such is employed as a comonomer, especially in conjunction with styrene as the other comonomer.

As indicated above, a solvent is employed for particularly advantageous purposes in the instant process, and this solvent is generally defined as one which will dissolve the monomers and catalyst employed, as well as the copolymer which is produced at the reaction conditions and preferably also at normal conditions. The solvent is also preferably essentially inert in the reaction system in the sense that it is non-reactive with the olefinic or maleic compound. It can, however, exhibit a chain terminating effect and, in some cases, such compounds are preferable. While any solvent which meets these criteria and is also liquid under the reaction conditions can be employed, it has been found that the ketones are particularly well suited. Illustrative of such ketones are acetone, diethyl ketone, dipropyl ketone, cyclohexanone, methyl ethyl ketone, ethyl propyl ketone, benzyl phenyl ketone, butyl phenyl ketone, and the like. While, in general, such ketones can be further substituted by functional groups which are essentially non-reactive in the system, such as the halogens, nitro, hydrocarbon and the like groups, it is preferred that the ketone contain only carbon, hydrogen and oxygen atoms. Ketones which contain a carbon atom having at least one hydrogen atom attached thereto attached to and adjacent to the carbonyl carbon atom are most effective and comprise a particular embodiment. Accordingly, a particularly preferred group of ketones comprises the lower boiling ketones; e.g., boiling below about 200° C., especially acetone, acetophenone, methyl ethyl ketone, and methyl propyl ketone. It is to be understood that mixtures of the above-described solvents can be employed if desired.

The processing techniques of the invention are subject to many variations, provided that all three of the main ingredients are brought into contact with each other and essentially instantaneously brought to the desired polymerization temperature. By way of example, separate streams of the olefinic compound, maleic compound, and catalyst (in each instance, with or without the solvent) at temperatures at which copolymerization would not take place are brought into intimate contact with each other in a zone which is maintained at the polymerization temperature. This zone is most effectively obtained by using a heel or sink of the aforedescribed solvents maintained at the desired polymerization temperature. Thus, in this fashion, incremental amounts of the reagents are essentially instantaneously brought to the polymerization temperature and reacted essentially instantaneously, whereby there is no build up of unreacted monomers in the reaction zone. The rate of feed of the reagents to the reaction zone is preferably controlled so that no more than 3 percent by weight of unreacted monomer is present therein, and more preferably no more than 1 percent by weight of unreacted monomer, at the polymerization temperature. A particularly effective processing technique which comprises an especially preferred embodiment of the invention is to employ a completely miscible and homogeneous solution of the monomers and catalyst which is retained at a temperature below that at which significant polymerization would take place as a feed stream to a reactor or reaction zone in which a heel of the solvent, preferably the same as the solvent employed in formulating the feed solution, is maintained at the desired polymerization temperature, generally above about 80° C. By this particular processing, an essentially instantaneous polymerization is obtained whereby no substantial build up of unreacted monomer results and there is no uncontrollable reaction to result in the explosive mixtures experienced heretofore by the prior art processes. Indeed, the polymers so produced have the unique characteristic of a more narrow molecular weight range than obtainable heretofore as exhibited by the fact that, generally, the recovered polymer will have a narrow melting point range. Further, more selective production of a desired polymer having specific characteristics of molecular weight, viscosity, melting point, and molar ratio of comonomers in the product is now possible.

The instant invention will be more readily understood from the following examples.

EXAMPLE 1

Into a 3-gallon mixing vessel was added 1130 grams of methyl ethyl ketone. Then there was added thereto, with agitation, 777 grams of maleic anhydride. Next 828 grams of styrene and 95 grams of benzoyl peroxide were added with mild agitation to effect solution of all of the ingredients in the methyl ethyl ketone. All of the mixing operations were performed at essentially room temperature. The solution so formed is hereafter referred to generally as "Solution-A." Into a separate 5-gallon stainless steel reaction vessel equipped with internal agitation, a means for externally heating the reactor and its contents, a means for feeding reagents, and a means for discharging the reaction products was added 3220 grams of methyl ethyl ketone. This heel of methyl ethyl ketone was heated to a temperature of about 145° C. at autogenous pressure (about 65 p.s.i.). Then the Solution-A pre-mixed as described above was continuously fed to the reactor containing the heel over a period of one hour, while maintaining the temperature of the contents of the reactor essentially constant at about 145° C. by heating or cooling as required with the pressure at about 65 p.s.i. The reaction was essentially instantaneous. At the completion of feeding the Solution-A to the reactor, the pressure on the reaction vessel was released causing much of the solvent to vaporize and the reaction mixture (a homogeneous solution) was then subjected to a vacuum in order to draw off the remaining methyl ethyl ketone. The resultant polymer, still containing a minor amount of methyl ethyl ketone, was then transferred to a dryer and dried at 110° C., recovering the methyl ethyl ketone evolved. The product was pulverized to a white, free-flowing powder, a sample of which was analyzed. It was found that the product obtained had a melting point range of 150–160° C. Ten grams of the product thus obtained were dissolved in acetone to a volume of 100 milliliters. The viscosity of this solution was obtained by the standard technique employing an Oswald viscosimeter at 30° C. It was found to have a viscosity of 0.716 centistoke at 30° C. The Gardner color of this solution was 1.

EXAMPLE 2

The procedure of Example 1 was repeated essentially as described, with exception that in forming the Solution-A, 3597 grams of methyl ethyl ketone, 1656 grams of styrene, 777 grams of maleic anhydride, and 76 grams of benzoyl peroxide were employed with all other conditions and proportions being essentially the same. Thus, in this run, molar proportions of essentially 2:1 of styrene to maleic anhydride were employed, and a smaller amount of the benzoyl peroxide was employed. When recovering the product and analyzing essentially as described in Example 1, it was found that an essentially 100 percent conversion of all of the reagents to copolymer was obtained, demonstrated that a copolymer of 2 moles of styrene per mole of maleic anhydride was produced. The product had an acid number of 383, whereas the theoretical is 366; a melting point range of 150–170° C., with the viscosity of the 10-gram solution thereof in 100 milliliters of acetone at 30° C. being 0.847 centistoke. The Gardner color of the acetone solution was 1.

EXAMPLE 3

The procedure of Example 1 was repeated essentially as described, with exception that the Solution-A was formed by dissolving 76 grams of benzoyl peroxide, 2484 grams of styrene, and 777 grams of maleic anhydride in 3597 grams of methyl ethyl ketone at room temperature; and the heel of methyl ethyl ketone present in the reactor was 3220 grams. Thus essentially 3 moles of styrene per mole of maleic anhydride were employed. Upon recovering the product as described in Example 1, in analysis it was found that the product had a melting point range of 155–170° C. and an acid number of 291. The viscosity in the 10 percent acetone solution was 0.993 centistoke and the Gardner color was 1.

EXAMPLE 4

Solution-A comprising 657 grams of acetone, 123 grams of maleic anhydride, 131 grams of styrene, and 5 grams of 30 percent aqueous hydrogen peroxide was slowly added to a 2-liter resin kettle containing 590 grams of refluxing acetone. Refluxing of the acetone and stirring was maintained throughout the addition time, which was 60 minutes. The mixture was further stirred and refluxed for an additional 30 minutes. The acetone was then distilled off from the mixture, leaving 250 grams of essentially dry powder product, representing a yield of 98.5 percent. To the product was added 462 grams of water and 302 grams of a 58 percent ammonium hydroxide solution. The mixture was heated with agitation at 90° C. for two and one-half hours. At the end of this period a clear solution was obtained of the hydrolyzed resin.

EXAMPLE 5

At room temperature a Solution-A was formed of 285 grams of methyl ethyl ketone, 123 grams of maleic anhydride, 131 grams of styrene, and 1.5 grams of benzoyl peroxide. In a separate kettle 254 grams of methyl ethyl ketone were heated to the reflux temperature; and then the afore-mentioned reagent Solution-A was fed to the kettle over a period of 30 minutes with continuous agitation. The mixture was refluxed for an additional 30 minutes. Then a vacuum was drawn on the reactor to remove part of the methyl ethyl ketone solvent, leaving a viscous mass (about 429 grams). This mass was transferred to a tray and dried in an oven at 110° C. for one hour. The resulting dried material was broken into pieces in a mortar and then dried at 110° C. for an additional one hour. Analysis of the product indicated an acid number of 520, and melting point range of 225–285° C. The yield obtained was 243 grams, or 95.5 percent. When dissolving 10 grams of the product in acetone, diluting the solution to 100 milliliters, then determining the viscosity at 30° C. in an Oswald viscosimeter, it was found that the viscosity was 11.9 centistokes. Determining the color of the acetone solution according to the Gardner scale, the color was found to be less than 1.

EXAMPLE 6

The procedure of Example 5 was repeated essentially as described with exception that only 0.03 gram of benzoyl peroxide was employed, but all other proportions and materials were identical. In this instance 236 grams of dried product were obtained, representing a yield of 93 percent. The product had an acid number of 517, an acetone solution viscosity of 111 centistokes, and a Gardner color of less than 1.

The following example serves to illustrate the production of a 1:1 styrene-maleic anhydride copolymer of low viscosity and low molecular weight on a larger scale.

EXAMPLE 7

In this instance, to an 80-gallon stainless steel reactor equipped with external heating and a means for overflow of product solution at about the 65-gallon level was added 55 gallons of methyl ethyl ketone. This solvent was heated to 141° C. at a pressure of 70 p.s.i. and maintained at these conditions throughout the run with continuous agitation. In a separate mixing vessel 522 pounds methyl ethyl ketone, 100 pounds maleic anhydride, 107 pounds styrene, and 12 pounds benzoyl peroxide were thoroughly mixed at room temperature to obtain a homogeneous solution. This Solution-A was continuously fed to the reactor containing the refluxing methyl ethyl ketone over a period of 4 hours with product solution continuously overflowing from the reactor. The overflow stream was collected in an external pressure vessel. When the feed had been completed, thus also stopping the overflow, the pressure was released from the external collecting vessel, a vacuum drawn and heat applied to maintain a temperature of 1850° C. to remove the methyl ethyl ketone from the product leaving a melt of the product in the kettle. The product was removed from the kettle by gravity flow, then cooled. The product can be then ground to a free-flowing white powder. The product obtained had an acetone solution viscosity at 30° C. of 0.749 centistoke.

The above examples have been presented by way of illustration, and it is not intended to be limited thereby. Thus, similar results are obtained when other olefinic compounds, maleic compounds, catalysts, solvents, and conditions as described herein are substituted.

The catalysts which are employed according to the process are subject to considerable choice among those of the free-radical generating type. The organic peroxides or hydrogen peroxide have been found to be most effective and thus are particularly well suited to the processing of the present invention. Such organic peroxides are illustrated by the various aliphatic, cycloaliphatic, and aromatic peroxides, particularly those which are preferably soluble in the reaction system and comparatively stable at temperatures below about 60° C. Thus, included among such organic peroxides are, for example, tertiary butyl hydroperoxide, cumene hydroperoxide, cyclohexanone peroxide, methyl ethyl ketone peroxide, methyl isobutyl ketone peroxide, acetyl peroxide, benzoyl peroxide, naphthoyl peroxide, lauroyl peroxide, ditertiary butyl peroxide, diacetyl peroxide, dicumyl peroxide, as well as other free-radical generating catalysts such as azodiisobutyronitrile and the like. The preferred free-radical generating catalysts are the organic peroxides which are comparatively stable up to temperatures of about 60° C., especially benzoyl peroxide, dicumyl peroxide, and 2,5-dimethyl-2,5-di(t-butyl peroxy)hexane. Benzoyl peroxide is particularly effective at polymerization temperatures between about 90–115° C.; dicumyl peroxide is particularly effective at temperatures between about 150° to 200° C.; and 2,5-dimethyl-2,5-di(t-butyl peroxy)hexane is especially effective at temperatures between about 200–250° C.

The proportion of the reagents, solvent and catalyst employed in the copolymerizations can be varied to a considerable extent, depending primarily upon the desired copolymer. For example, by the present processing proportions of olefinic compound to maleic compound, between about 1:1 to 20:1 and higher can be employed to result in polymers containing the same molar proportions. It is preferred, however, to employ molar proportions of the olefinic compound to the maleic compound between about 1:1 to 3:1 respectively. Ordinarily the solvent is employed in forming the Solution-A in amount sufficient to provide a homogeneous solution at temperatures below which significant polymerization would take place. Further, in the Solution-A of the monomers and catalyst, the concentration of the monomers can vary between about 5 to 75 percent by weight, based upon the total weight of the monomers and the solvent. It is preferred, however, to employ concentrations between about 30 to 60 percent by weight. Likewise, the amount of heel in relation to the Solution-A can also be varied but generally will range from about 0.25:1 to 1:0.25 respectively by volume. In preferred embodiments, essentially 1.5 volumes of the Solution-A to 1.0 volume of heel are employed, at least for start-up purposes. Of course, in continuous processing, the volume relationship of the Solution-A to the heel solution is of no particular consequence.

The catalyst is also employed in varying proportions, depending upon which one is employed, the reaction temperature, and the molecular weight of the copolymer desired. In general, however, catalyst proportions of up to about 10 percent by weight, based upon the total weight of the monomers, are all that are required even though larger amounts could be employed. In preferred embodiments, catalyst concentrations between 0.001 to 5.0 (more especially 0.02 to 5) percent by weight, based on the total weight of the monomers, are employed.

The temperature at which the heel is maintained, i.e., the temperature of polymerization, can be varied considerably from that temperature necessary to initiate reaction up to and including about 300° C. and higher. In all embodiments, however, it is more practical to employ temperatures between about 75–250° C., preferably 150–250° C., with, if necessary, autogenous or appropriate pressure conditions by the addition of an inert gas such as nitrogen to maintain the reaction system in the liquid state.

As illustrated by the above discussion and the examples presented herein, the polymer product is affected, particularly with regard to its viscosity and molecular weight, by a combination of factors; viz., the concentration of the monomers in the Solution-A, the temperature of polymerization, the concentration of catalyst employed, and the relative concentrations of the solvent that is employed. However, the processing is especially effective toward the production of copolymers of mono-olefinic compound and maleic compound, especially styrene and maleic anhydride, in molar proportions between about 3:1 to 1:1, respectively, having melting points below about 225° C., a melting point range of less than 25° C., and a molecular weight below 3000 (especially below about 2000), and acetone solution viscosities of less than 1.0 centistoke.

While polymerization generally occurs quite readily at temperatures of the order of about 75° C. and higher, with certain catalysts it is sometimes desirable to employ catalyst activators in order to effect free-radical initiation at lower temperatures. Among the criterial of choice of the catalyst activators is that it be preferably inert to the monomers and solvent at the conditions of polymerization. For this purpose the amines, especially the dialkyl aromatic amines, are quite effective. Another class of activators which can be employed are the cobalt salts as, for example, cobalt hexoate, lauroate, palmitate, and naphthenate, and other cobalt, vanadium, manganese and similar drying oil fatty acid salts. The amines and cobalt salts comprise the catalyst activators which have been found most effective, although others can be employed. The dialkyl tertiary aromatic amines wherein the alkyl groups contain up to about 4 carbon atoms are preferred, especially N,N-dimethyl aniline, and the best results are obtained when such are employed with acyl peroxide catalysts or benzoyl peroxide. The cobalt salts, especially cobalt naphthenate, are preferred when employing methyl ethyl ketone peroxide or 1-hydroxycyclohexyl hydroperoxide as the catalyst.

While the proportion of the catalyst activator can be varied, in general up to about 10 percent by weight thereof, based upon the weight of the free-radical initiating catalyst employed, has been found practical. For most efficient and effective operation, the activator, when employed, is used in amounts between about 0.0001 to about 0.1 percent by weight, based upon the weight of the catalyst.

The following example is illustrative of that embodiment of the invention wherein the catalyst activators are employed, although it is not intended to be limited thereby.

EXAMPLE 8

The procedure of Example 5 was repeated essentially as described, with the exception that to the heel of methyl ethyl ketone there was added 2 milliliters of N,N-dimethyl aniline. At the completion of the reaction and recovery of product, a yield of 98.5 percent was obtained of resin having an acid number of 534, an acetone solution viscosity of 2.94 centistokes, and the Gardner color of the acetone solution was between 1 and 2.

Thus the above example illustrates that the employment of the activators will produce a product having a much lower acetone solution viscosity than is obtained when employing the identical conditions in the absence of the activator. It has been found that, in general, the greater the proportion of the activator in relation to the catalyst, the lower the viscosity of the product obtained. Thus, when the above example was repeated substituting 0.15 gram and 0.75 gram of the dimethyl aniline in two separate runs, acetone solution viscosities of 6.85 centistokes and 4.42 centistokes, respectively, were obtained.

Similar results are obtained when other catalyst activators as described hereinbefore are substituted.

A still further and particularly unique embodiment of the invention comprises the replacement of a portion of the aforedescribed solvents by a different or second solvent which exhibits solubility for the monomers but in which the copolymer produced is normally insoluble. In this instance both solvents are employed in amounts which will still result in the polymer produced being soluble in the total solvent system under the conditions of polymerization. Thus such different or second solvents are also soluble in the afore-described solvents, resulting in an essentially homogeneous solution of the product in the reaction system. By this processing, many economies are effected in that more costly solvents can be partially replaced by less costly solvents. Additionally, a more facile recovery of each of the solvents employed in the mixture of solvents is possible. Still further, it has been quite unexpectedly found that the mixture of solvents is not deleterious to the accomplishment of the results desired but, indeed, promotes the formation of a more pure product and is especially adaptable to the formation of the most desired polymers, i.e., those polymers having an acetone solution viscosity below about 1 centistoke and molecular weight below 2000, especially of styrene and maleic anhydride. Additionally, it has been found that the use of mixtures of solvents, especially of a ketone and hydrocarbon, results in copolymers having better color and whose hydrolyzed solutions are less viscous than when a ketone alone is used as the solvent.

Thus, as the cosolvent, conventional hydrocarbons and halogenated hydrocarbons can be used. Again, these solvents should be liquid under the reaction conditions and essentially inert, although chain stopping solvents can be employed and in most instances are preferred. Included among the solvents which can be employed are naphthas and the like and the aromatics as, for example, benzene, toluene, cumene, p-cymene, xylene, ethylbenzene, tetrahydronaphthalene, and mixtures thereof, and the like. Among the halogenated hydrocarbons which can be employed are included, for example, the various chloro, bromo, and iodohexanes, carbon tetrachloride, methylene dichloride, chlorocyclohexane, chlorobenzene, benzyl chloride, and the like, with the chloro aromatics being most effective.

A particularly unique class of cosolvent to be employed is a hydrocarbon compound of the above type in which a carbon atom is attached to a 6-membered carbocyclic ring with at least one hydrogen attached to the carbon atom, and the remaining valences of the carbon atom are satisfied by a radical selected from the group consisting of alkyl, aryl, and alkaryl radicals, preferably alkyl in which the alkyl group contains from 1 to 4 carbon atoms. The employment of this particularly unique class of cosolvent in conjunction with the principal solvents discussed previously enhances the production of copolymers in even greater selectivity having more desirable molecular weight, melting point, and viscosity characteristics, especially when styrene and maleic anhydride are employed. Included among the especially preferred solvents of this particular type are cumene, o-, m-, or p-cumene, diisopropyl benzene, and triisopropyl benzene.

The following examples will illustrate this embodiment of the invention.

EXAMPLE 9

The procedure of Example 1 was again employed essentially as described therein. In this instance, 1130 grams of solvent comprising equal proportions by weight of methyl ethyl ketone and cumene was used for forming the Solution-A in which 777 grams of maleic anhydride, 828 grams of styrene, and 76 grams of dicumyl peroxide were dissolved. The heel in the reactor comprised 4000 milliliters of a mixture comprising equal parts by weight of methyl ethyl ketone and cumene. This heel was brought to and maintained during the course of the run at a temperature of about 176° C. with the pressure maintained at about 97 p.s.i.g. with agitation. The Solution-A was fed to the pre-heated heel continuously over a period of one hour. At the completion of the feeding, the pressure was released from the reactor and a vacuum drawn to remove the methyl ethyl ketone. Then further vacuum was drawn to remove the cumene solvent. The viscous suspension of polymer wet with cumene was removed from the reactor and washed with petroleum ether. The washed product was then ball-milled with about 3 liters of petroleum ether, filtered, and dried at 110° C. The resultant free-flowing white powder had an acetone solution viscosity of 0.642 centistoke and the Gardner color was 1.

EXAMPLE 10

The procedure of Example 9 was repeated essentially as described, with exception that only 38 grams of dicumyl peroxide were employed as the catalyst and the heel comprised 4000 milliliters of equal parts by volume of the cumene and methyl ethyl ketone, with all other conditions being essentially identical. The product which was recovered had an acid number of 494, a melting point range of 175–185° C., with the acetone solution viscosity being 0.682.

EXAMPLE 11

Employing the procedure essentially as described in Example 7, the solution-A was prepared employing 471 pounds of solvent mixture comprising 70 percent by weight cumene and 30 percent by weight methyl ethyl ketone. With agitation 150 pounds of maleic anhydride, 321 pounds of styrene, and 1110 grams of dicumyl peroxide were added and mixed thoroughly at room temperature. In the reactor there was contained 65 gallons of a previous run of a 70/30 mix of cumene and methyl ethyl ketone and 50 percent polymer by weight. This solvent mix was maintained at 227° C. at 140–150 p.s.i., with these conditions being maintained throughout the run. The Solution-A was fed to the pre-heated heel at a rate of 3½ to 5½ pounds per minute of reactants. At the completion of the feed, the product was recovered as described in the preceding example. This product had an acetone solution viscosity of 0.745, a Gardner color of 1, and an essentially quantitative conversion was obtained of copolymer containing styrene to maleic anhydride in the molar ratio of 2:1, respectively.

The above examples have been presented by way of illustration of that embodiment of the invention employing mixed solvents, and it is not intended to be limited thereto. By appropriate substitution, particularly of the ketones and the above-described hydrocarbon solvents, similar results are obtained.

In the mixed solvent systems illustrated by the preceding examples, it is preferable to employ a cosolvent, especially a hydrocarbon solvent, having a boiling point above that of the other solvent, particularly the ketone. In general the cosolvent should have a boiling point at least 20 degrees higher than that of the principal solvent. The amount of cosolvent employed in relation to the amount of principal solvent can be varied over a considerable range, provided that both the monomers and the polymer product are essentially completely soluble in the solvent mix at reaction temperature and pressure. In general, amounts between about 20 to 75 percent by weight of cosolvent, based on the total weight of solvent, are employed; however, for most effective operation, between about 50 to 70 percent by weight of the second or cosolvent based on the total weight of solvent are employed.

As briefly indicated hereinabove, the copolymer products produced according to the invention are of considerable utility. Thus, they can be used in adhesives and binders, coatings for paper, ceramic, leather, textiles, and the like. They can also be employed in the preparation of aqueous solutions with alkali metal, ammonium, or organic bases, particularly the low molecular weight, low viscosity copolymers which result in solutions, in water, of low viscosity. These solutions are quite adaptable in coating applications. Still further, the solutions of copolymer as directly obtained from the reaction can be employed in coating applications. Additionally, the copolymer products can be reacted with monohydric alcohols to form various esterification products, including partial esters, half esters, and full esters, which are also useful in coating compositions. Additionally, the products can be cross-linked with various polyhydric alcohols to produce compositions readily susceptible to coating operations. Still other uses for the products produced will now be evident.

Having thus described the process of this invention, it is not intended to be limited except as set forth in the following claims.

I claim:
1. A process for the manufacture of copolymer which comprises simultaneously bringing a compound having a terminal polymerizable carbon-to-carbon double bond, a maleic compound having the structural formula:

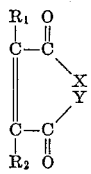

wherein $R_1$ and $R_2$ are selected from the group consisting of hydrogen, halogen, sulfonic acid, alkyl, aryl and aralkyl radicals and X and Y are selected from the group consisting of hydroxy, alkoxy, aryloxy and halogen radicals or X and Y are both supplied by a single $>O$ or $>NH$ radical, and free-radical initiating catalyst into contact with a solvent which has been pre-heated to a polymerization temperature of about 75 to 300° C., and which is a solvent for both the monomers and the copolymer produced.

2. A process for the manufacture of a styrene-maleic anhydride copolymer which comprises feeding a solution of styrene, maleic anhydride, and free-radical initiating catalyst in methyl ethyl ketone to a pre-heated heel of methyl ethyl ketone which is maintained at a polymerization temperature of about 75 to 300° C. and contains less than about 3 percent by weight of unreacted monomer therein.

3. The process of claim 2 wherein said methyl ethyl ketone heel is maintained at a temperature between about 150°–250° C.

4. The process of claim 3 further characterized in that said maleic anhydride and styrene are employed in essentially equimolar quantities, said catalyst is benzoyl peroxide and is employed in amount between about 0.02 to 5 percent by weight, based upon the total weight of monomers, said solution contains approximately 50 percent by weight of said monomers and catalysts, based upon the total weight of said solution, and said heel comprises approximately an equal volume to that of said solution.

5. The process of claim 3 wherein said styrene and maleic anhydride are employed in molar proportions of at least 2 to 1 respectively.

6. A process for the manufacture of a copolymer which comprises simultaneously bringing a compound having a terminal polymerizable carbon-to-carbon double bond, a maleic compound having the structural formula:

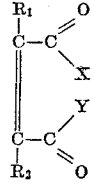

wherein $R_1$ and $R_2$ are selected from the group consisting of hydrogen, halogen, sulfonic acid, alkyl, aryl and aralkyl radicals and X and Y are selected from the group consisting of hydroxy, alkoxy, aryloxy and halogen radicals or X and Y are both supplied by a single >O or >NH radical, and a free-radical initiating catalyst into contact with a mixture of at least two different solvents which has been pre-heated to a polymerization temperature of about 75 to 300° C., and in which one of said solvents is a solvent for both the monomers and the copolymer produced, and the other solvent is a solvent in which the monomers are soluble but the copolymer produced is normally insoluble, said copolymer being soluble in the reaction mixture.

7. The process of claim 6 further defined wherein one of said solvents is a ketone and the other solvent is an aromatic hydrocarbon.

8. The process of claim 7 further defined in that said mixture of solvents is maintained at a temperature between 150–250° C.

9. A process for the manufacture of a styrene-maleic anhydride copolymer which comprises feeding a solution of styrene, maleic anhydride, and free-radical initiating catalyst dissolved in a mixture of methyl ethyl ketone and cumene to a pre-heated heel of a mixture of methyl ethyl ketone and cumene which is maintained at a temperature between about 150–250° C. and contains less than about 3 percent by weight of unreacted monomer therein, said copolymer being soluble in the reaction mixture.

10. The process of claim 9 further characterized in that said maleic anhydride and styrene are employed in essentially equimolar quantities, said catalyst is benzoyl peroxide and is employed in amount between about 0.02 to 5 percent by weight, based upon the total weight of the monomers, said solution contains approximately 50 percent by weight of said monomers and catalyst, based upon the total weight of said solution, said heel comprises approximately an equal volume of said solution, and both said solution and said heel comprise approximately equal parts by weight of said methyl ethyl ketone and said cumene.

1. The process of claim 9 wherein said styrene and maleic anhydride are employed in molar proportions of at least 2 to 1 respectively.

References Cited
UNITED STATES PATENTS

| | | | |
|---|---|---|---|
| 3,207,718 | 9/1965 | Zimmerman et al. | 260—78.5 |
| 2,744,098 | 5/1956 | Towne | 260—78.5 |
| 2,294,226 | 8/1942 | D'Alelio | 260—32 |
| 2,606,891 | 8/1952 | Rowland | 260—78.5 |
| 2,675,370 | 4/1954 | Barrett | 260—78.5 |
| 3,336,267 | 8/1967 | Zimmerman et al. | 260—78.5 |

OTHER REFERENCES
Webster's New International Dictionary (1954).

JOSEPH SCHOFER, *Primary Examiner.*

J. KIGHT, *Assistant Examiner.*

U.S. Cl. X.R.

260—95